US012770270B2

(12) United States Patent
Madhok et al.

(10) Patent No.: US 12,770,270 B2
(45) Date of Patent: Oct. 20, 2026

(54) TECHNIQUES FOR ROBUST REAL-TIME MULTIPLE-OBJECT TRACKING WITH DETECTION PROPAGATION AND PER-CLASS OPTIMIZATION

(71) Applicant: Microsoft Technology Licensing, LLC, Redmond, WA (US)

(72) Inventors: Rishi Madhok, Redmond, WA (US); Cassandra Min Burgess, Redmond, WA (US); Nikolaos Karianakis, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 268 days.

(21) Appl. No.: 18/642,890

(22) Filed: Apr. 23, 2024

(65) Prior Publication Data

US 2025/0329029 A1 Oct. 23, 2025

(51) Int. Cl.

*G06T 7/20* (2017.01)
*G06T 5/20* (2006.01)

(Continued)

(52) U.S. Cl.

CPC .................. *G06T 7/20* (2013.01); *G06T 5/20* (2013.01); *G06V 10/25* (2022.01); *G06V 10/761* (2022.01); *G06V 2201/07* (2022.01)

(58) Field of Classification Search

CPC ... G06T 7/20; G06T 5/20; G06T 2207/20081; G06T 2207/20084; G06T 2207/30196;

(Continued)

(56) References Cited

U.S. PATENT DOCUMENTS

| | | | | |
|---|---|---|---|---|
| 7,665,041 B2 * | 2/2010 | Wilson | .................... | G06F 3/017 715/863 |
| 8,745,541 B2 * | 6/2014 | Wilson | .................... | G06F 3/038 345/158 |

(Continued)

OTHER PUBLICATIONS

Byte Track: Multi-Object Tracking by Associating Every Detection Box, Yifu Zhang and Pei Sun and Yi Jiang and Dongdong Yu and Zehuan Yuan and Ping Luo and Wenyu Liu and Xinggang Wang, ArXiv, abs/2110.06864 (Year: 2021).*

(Continued)

*Primary Examiner* — Delomia L Gilliard

(74) *Attorney, Agent, or Firm* — NovoTechIP International PLLC

(57) ABSTRACT

A data processing system implements obtaining a frame of video content at an object detection pipeline, the video content comprising a plurality of frames; analyzing the frame using an object detection model to detect a plurality of objects and associate each object with a confidence score; performing a primary matching operation on high confidence detection objects to associate the high confidence detection objects with an object track of a plurality of object tracks, the high confidence detection objects being objects associated with a confidence score that satisfies a confidence threshold; performing a secondary matching operation on low confidence detection objects to associate the low confidence detection objects with an object track of the plurality of object tracks, low confidence detection objects being objects associated with a confidence score that does not satisfy the confidence threshold; and outputting the plurality of object tracks.

18 Claims, 13 Drawing Sheets

(51) Int. Cl.
*G06V 10/25* (2022.01)
*G06V 10/74* (2022.01)

(58) Field of Classification Search
CPC . G06T 2207/30232; G06T 2207/30241; G06T 7/246; G06T 7/277; G06V 10/25; G06V 10/761; G06V 2201/07; G06V 10/62; G06V 20/52
See application file for complete search history.

(56) References Cited

U.S. PATENT DOCUMENTS

| | | | | |
|---|---|---|---|---|
| 10,621,735 | B2 * | 4/2020 | Saleemi | G06T 7/285 |
| 10,936,902 | B1 * | 3/2021 | Bagwell | G06T 7/73 |
| 2020/0082549 | A1 * | 3/2020 | Dehghan | G06V 40/172 |
| 2021/0042592 | A1 * | 2/2021 | Hashimoto | G06V 10/764 |
| 2021/0192182 | A1 * | 6/2021 | Huang | G06F 18/2413 |
| 2022/0301183 | A1 * | 9/2022 | Kang | G06T 7/70 |
| 2023/0326346 | A1 * | 10/2023 | Schwartz | G08G 1/166 701/301 |
| 2023/0359887 | A1 * | 11/2023 | Chen | G06V 10/774 |
| 2024/0144489 | A1 * | 5/2024 | Nguyen | G06T 7/248 |
| 2024/0312027 | A1 * | 9/2024 | Patsekin | G06T 7/248 |
| 2025/0329029 | A1 * | 10/2025 | Madhok | G06T 7/246 |
| 2026/0054498 | A1 * | 2/2026 | Alvarez | B41J 2/19 |

OTHER PUBLICATIONS

Bewley, et al., "Simple Online and Realtime Tracking", arXiv:1602.00763v2, Jul. 7, 2017, 5 pages.
Kalman, R., "A New Approach to Linear Filtering and Prediction Problems", Transactions of the ASME—Journal of Basic Engineering, vol. 82, 1960, pp. 35-45.
Wojke, et al., "Simple Online and Realtime Tracking with a Deep Association Metric", arXiv:1703.07402v1, Mar. 21, 2017, 5 pages.
Zeng., et al., "MOTR: End-to-End Multiple-Object Tracking with Transformer", arXiv:2105.03247v4, Jul. 19, 2022, 17 pages.

* cited by examiner

TECHNIQUES FOR ROBUST REAL-TIME MULTIPLE-OBJECT TRACKING WITH DETECTION PROPAGATION AND PER-CLASS OPTIMIZATION

BACKGROUND

With the widespread use of cameras across many applications, detecting and tracking objects in videos provides necessary information for scientific research, understanding, and business decisions. Multi Object Tracking (MOT) is an active area of research in the field of computer vision where the task is to identify all objects of interest in a video and maintain a persistent identity through subsequent frames. Each object is assigned a unique identifier (ID) that identifies the object throughout the video. MOT tracks multiple objects, often from multiple object classes throughout a video. In contrast, single object tracking (SOT) tracks a single object of interest throughout a video. MOT has numerous applications including but not limited to video surveillance, augmented reality, and autonomous driving.

The two most common MOT approaches are end-to-end tracking and tracking by detection. End-to-end tracking is an approach that directly outputs tracks without an explicit association procedure. The global optimization approach of end-to-end tracking can provide better consistency to tracks but requires more computational resources and often suffers from reduced detection performance. Tracking by detection is another common approach used in MOT. In this approach, a detector is used to locate objects in each frame of the video. The detected objects are then associated across frames using features such as appearance and estimated motion. Tracking by detection offers several advantages: it is generally fast, easy to implement, and compatible with a variety of state-of-the-art detector models in a flexible plug-and-play fashion. Deployment of these algorithms in real-world scenarios exposes new challenges such as handling changing object appearance, occlusions, sensor artifacts, simultaneously tracking diverse classes, and achieving extremely high processing speeds in order to meet customer requirements and enable user adoption. Hence, there is a need for improved systems and methods that provide a technical solution for implementing accurate and reliable MOT techniques.

SUMMARY

An example data processing system according to the disclosure includes a processor and a memory storing executable instructions. The instructions when executed cause the processor alone or in combination with other processors to perform operations including obtaining a frame of video content at an object detection pipeline, the video content comprising a plurality of frames; analyzing the frame of video content using an object detection model to detect a plurality of objects in the frame of video content, the object detection model associating each object of the plurality of objects with a confidence score; performing a primary matching operation on high confidence detection objects to determine first object tracks of the high confidence detection objects by associating the high confidence detection objects with an object track of a plurality of object tracks, the high confidence detection objects being objects from the plurality of objects associated with a confidence score that satisfies a confidence threshold, the first object tracks tracking the high confidence detection objects across the plurality of frames; performing a secondary matching operation on low confidence detection objects to associate the low confidence detection objects with an object track of the plurality of object tracks, low confidence detection objects being objects from the plurality of objects associated with a confidence score that does not satisfy the confidence threshold; and outputting, from the object detection pipeline, the first object tracks and the second object tracks.

An example method for multiple object tracking implemented in a data processing system includes obtaining a frame of video content at an object detection pipeline, the video content comprising a plurality of frames; analyzing the frame of video content using an object detection model to detect a plurality of objects in the frame of video content, the object detection model associating each object of the plurality of objects with a confidence score; performing a primary matching operation on high confidence detection objects to determine first object tracks of the high confidence detection objects by associating the high confidence detection objects with an object track of a plurality of object tracks, the high confidence detection objects being objects from the plurality of objects associated with a confidence score that satisfies a confidence threshold, the first object tracks tracking the high confidence detection objects across the plurality of frames; performing a secondary matching operation on low confidence detection objects to associate the low confidence detection objects with an object track of the plurality of object tracks, low confidence detection objects being objects from the plurality of objects associated with a confidence score that does not satisfy the confidence threshold; and outputting, from the object detection pipeline, the first object tracks and the second object tracks.

An example data processing system according to the disclosure includes a processor and a memory storing executable instructions. The instructions when executed cause the processor alone or in combination with other processors to perform operations including obtaining a frame of video content at an object detection pipeline, the video content comprising a plurality of frames; analyzing the frame of video content using an object detection model to detect a plurality of objects in the frame of video content, the object detection model associating each object of the plurality of objects with a confidence score; determining whether performing object detection on the frame would cause a frame rate of the object detection pipeline to fall below a threshold; responsive to determining that performing the object detection would not cause the frame rate to fall below the threshold, performing object detection and tracking comprising: performing a primary matching operation on high confidence detection objects to associate the high confidence detection objects with an object track of a plurality of object tracks, the high confidence detection objects being objects from the plurality of objects associated with a confidence score that satisfies a confidence threshold, and performing a secondary matching operation on low confidence detection objects to associate the low confidence detection objects with an object track of the plurality of object tracks, low confidence detection objects being objects from the plurality of objects associated with a confidence score that does not satisfy the confidence threshold; responsive to determining that performing the object detection would cause the frame rate to fall below the threshold, performing detection propagation to extrapolate object tracks for the plurality of objects from previously determined object tracks to extend the first object tracks and the second object tracks; and outputting, from the object detection pipeline, the first object tracks and the second object tracks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Techniques for multiple object tracking in video content are provided herein. These techniques provide a technical solution to the technical problems associated with current MOT techniques including end-to-end tracking and tracking by detection. End-to-end tracking is both computationally intensive and often suffers from reduced detection performance. Tracking by detections can suffer from failures due to changing object appearance, occlusions, sensor artifacts, and challenges resulting from simultaneously tracking diverse object classes. The MOT solutions provided herein address these and other technical problems associated with current MOT techniques by providing a multiple object tracking system with detection propagation and per-class optimization referred to herein as the MOT-P framework. The MOT-P framework runs an MOT to provide output tracks from a given video sequence. The MOT-P framework includes a customized MOT unit, a detection propagation unit, and an end-to-end per-class hyperparameter optimization unit. The MOT-P implements a two-stage detection matching process in the MOT unit to improve tracking in challenging scenes. The detection propagation unit continues tracking without the need to perform a new object detection operation. This approach increases the possible frame rates while maintaining detector performance. More specifically, the detection propagation unit implements a series of techniques that enable the extrapolation of detections from a previous frame, thereby eliminating the need to run the object detected at each frame as is done in current tracking by detection techniques. A technical benefit is that this approach effectively speeds up the end-to-end tracker framework and provides a smoother experience to end users. The end-to-end per-class hyperparameter optimization unit implements an automated end-to-end optimization process that identifies the best class-specific hyperparameters for the MOT by mimicking real-time run conditions. To handle varied object appearance and motion, the MOT utilizes class-specific parameters and tracking behavior is optimized separately for each class. A technical benefit of this approach is that the MOT-P framework can overcome adverse conditions such as but not limited to changing object appearance, object occlusions, and sensor artifacts, while simultaneously tracking diverse classes of objects. As a result, the MOT-P framework achieves extremely high processing speeds in order to meet customer requirements and enable user adoption. These and other technical benefits of the techniques disclosed herein will be evident from the discussion of the example implementations that follow.

Figure 1:
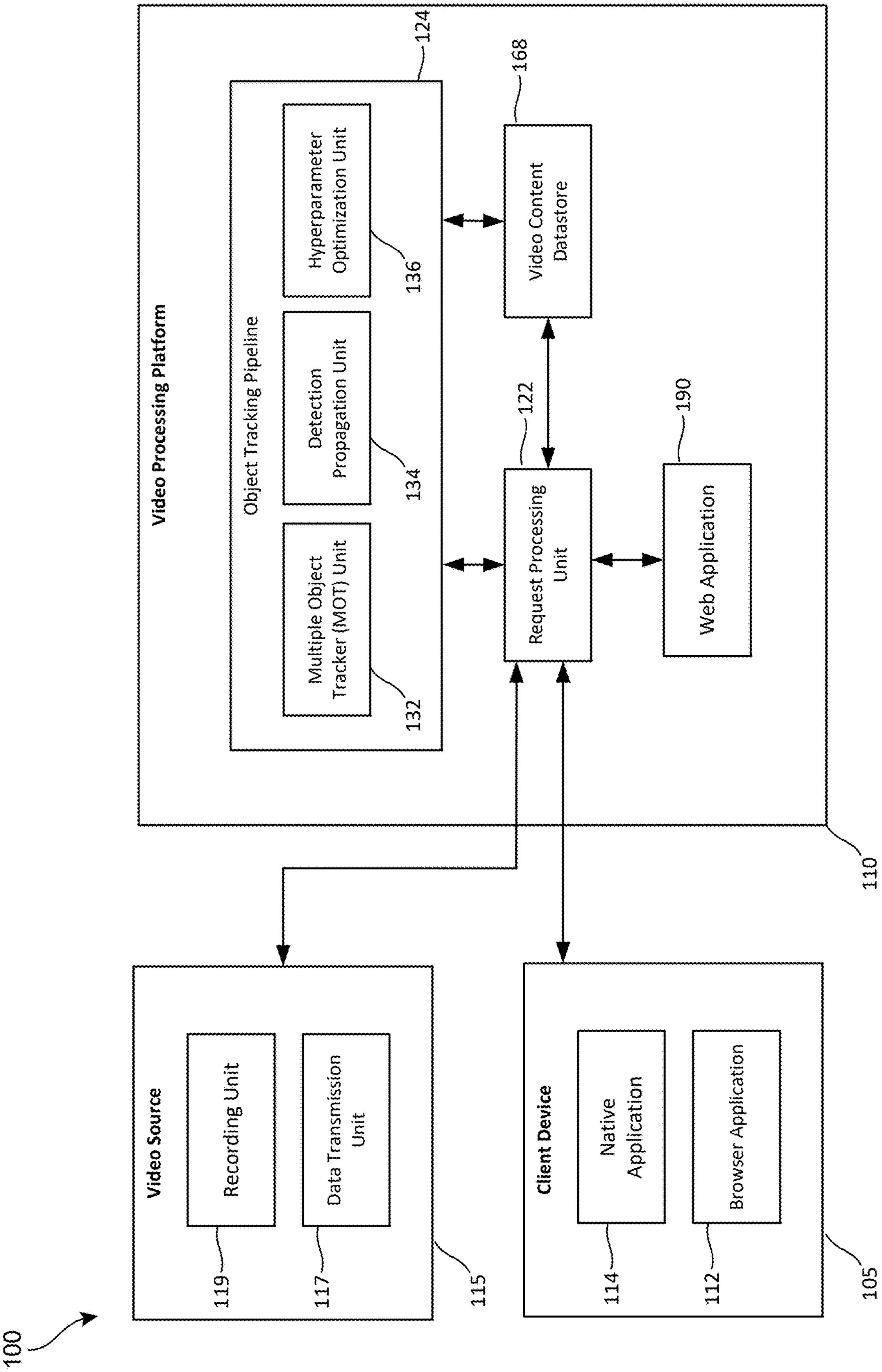
FIG. 1 is a diagram showing an example computing environment in which the techniques disclosed herein for object tracking are implemented.

FIG. 1 is a diagram showing an example computing environment 100 in which the techniques disclosed herein for object tracking may be implemented. The computing environment 100 includes a video processing platform 110. The example computing environment 100 also includes a client device 105. The client device 105 communicates with the video processing platform 110 via a network (not shown). The network connection may be a combination of one or more public and/or private networks and may be implemented at least in part by the Internet.

In the example shown in FIG. 1, the video processing platform 110 is implemented as a cloud-based service or set of services. However, in other implementations, the video processing platform 110 can be implemented on a server of a local network or in an implementation of the client device 105. For example, the video processing platform 110 may be implemented in an autonomous driving system of a vehicle, in a video surveillance system, in an augmented reality device, and/or in other systems that facilitate human-computer interaction. Furthermore, in some implementations, some or all the functionality of the video source 115 and/or the video processing platform 110 is implemented by the client device 105. For example, the client device 105 can comprise a wearable augmented reality device, a smartphone, tablet computer, or other computing device that implements the MOT techniques disclosed herein.

The video processing platform 110 is configured to receive video content captured by a video source 115. The video source 115 includes a recording unit 119 and a data transmission unit 117. The recording unit 119 is configured to obtain video content from one or more video cameras. The cameras may be part of a video surveillance system that includes cameras distributed across an area to be monitored, such as but not limited to a retail establishment, one or more roadways, a home or other residential building, a business or educational campus, and/or other areas in which tracking of people, vehicles, animals, and/or other objects over a series of frames of video content is needed. The recording unit 119 receives and buffers the video content received from the video cameras in a memory of the video source 115. In some implementations, the recording unit 119 stores a video content in a persistent memory that provides a backup of the video data. The persistent memory is a removable data storage device that can be read by the video processing platform 110. The data transmission unit 117 sends the video content captured by the data transmission unit 117 to the video processing platform 110 via a wired or wireless connection. The video source 115 may be located remotely from the video processing platform 110, and the video source 115 communicates with the video processing platform 110 over a network connection. In implementations in which the client device 105 is a wearable augmented reality device, a smartphone, tablet computer, or other computing device that implements the MOT techniques disclosed herein, the client device 105 can include one or more cameras and can implement the functionality of the recording unit 119 for capturing and storing video content to be processed on the client device 105.

The video processing platform 110 implements a request processing unit 122, an object tracking pipeline 124, a video content datastore 168, and a web application 190. The request processing unit 122 is configured to receive content from the video source 115 for storage and/or processing by video processing platform 110. The request processing unit 122 stores the video content in the video content datastore 168. The video content datastore 168 is a persistent datastore in the memory of the video processing platform 110 that enables video content captured by the video source 115 to be accessed by authorized users of the client device 105 and/or for object tracking to be performed on the video content. The video processing platform 110 can perform object tracking on one or more target objects in substantially real time as the video content is received by the video processing platform 110 and/or on one or more target objects in video content that was previously received and stored in the video content datastore 168. The object tracking pipeline 124 analyzes the video content and performs the object tracking. The object tracking pipeline 124 implements the MOT techniques provided herein. In some implementations, the object tracking pipeline 124 may also implement single object tracking (SOT) techniques in addition to the MOT techniques provided herein.

The object tracking pipeline 124 includes a multiple object tracking (MOT) unit 132, a detection propagation unit 134, and a hyperparameter optimization unit 136. The object tracking pipeline 124 may include additional components in other implementations that facilitate object tracking.

The MOT unit 132 identifies objects in video content and persists unique identifiers for these objects across all frames of the video content. The MOT unit 132 supports a minimum target frame rate, such as but not limited to 30 frames per second (FPS) to enable the system to process streaming video in real time. The MOT unit 132 supports a variety of object types that may be detected and tracked in the video content. The MOT unit 132 robustly handles real-world challenges, such as but not limited to object occlusions, changing object appearances, and other such issues.

In some implementations, the MOT unit 132 implements multiple object tracking that is based on DeepSORT (Deep Learning for Multiple Object Tracking) algorithm, which utilizes a combination of appearance and motion features to match objects across frames. The DeepSORT algorithm detections on each frame are matched to tracks based on their appearance features and motion state. Appearance features area extracted using the original Re-ID network from DeepSORT, and the motion state is tracked using a linear Kalman Filter. This customization of the DeepSORT algorithm with additional components discussed herein provides a novel framework that is engineered and fully tuned to provide a robust and adaptable MOT solution for numerous real-world scenarios.

The detection propagation unit 134 provides an independently implemented object detection functionality that can be integrated with the MOT unit 132. Various detection techniques may be implemented by the detection propagation unit 134. The object tracking pipeline 124 is capable of real-time processing of video streams. The object tracking pipeline 124 strategically sets a minimum target Frames Per Second (FPS) and assesses whether adequate time is available to execute object detection. Should the object tracking pipeline 124 determine time constraints prevent object detection from being performed by the MOT unit 132 on each frame of the video content, the object tracking pipeline 124 directs processing through the detection propagation unit 134. The detection propagation unit 134 predicts object locations in subsequent frames of the video content without requiring updated object detections to be performed. The detection propagation unit 134 can implement various techniques for detection propagation, including but not limited to: (1) a simple copy strategy in which the previous bounding box associated with a detected object from a previous frame of the video content is directly replicated to a subsequent frame; (2) a motion aware strategy using a customized Kalman Filter to predict bounding boxes in new frames based on the observed motions of each object, and (3) integration of the Reidentification (ReID) model for enhanced accuracy and robustness. A technical benefit of the object tracking pipeline 124 being able to switch between object detector execution and detection propagation is that this approach can significantly boost the overall frame rate of the object tracking pipeline 124 and ensures smooth and efficient processing of video streams in real-time.

The hyperparameter optimization unit 136 implements an end-to-end optimization process to select the optimal parameters for each class of object to be tracked, including thresholds, time to initialize, and weighting of motion versus appearance features in tracking. Parameters for each class are tuned separately to provide the maximum flexibility in handling diverse inter-class appearance and motion. Parameters are optimized by running the object tracking pipeline 124 numerous times with different parameters and selecting the best trials based on multiple metrics. A technical benefit of this approach is by that optimizing based on real-time conditions for the entire tracker the system identifies the best parameters for real world performance of the object tracking pipeline 124.

The request processing unit 122 is configured to receive requests from the native application 114 of the client device 105 and/or the web application 190 of the video processing platform 110. The requests may include but are not limited to requests to view video content captured by the video source 115 and/or track one or more objects in the video content according to the techniques provided herein. The native application 114 and/or the web application 190 provide a user interface that enables the user to access the video content and to track and target objects.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes just one client device, other implementations may include a different number of client devices 105 that utilize the video processing platform 110. In some implementations, the video processing platform 110, or at least a portion of the functionality thereof, is implemented by the native application 114 on the client device 105. The client device 105 may be a wearable device or a mobile device that provides an augmented reality experience in which digital context is overlaid onto real-life environments and/or objects captured using a camera of the client device 105 in some implementations. In such implementations, the object tracking techniques provided herein can be used to track the location of one or more real-world objects to facilitate generating of the digital overlays. In yet other implementations, the client device 105 is the navigation system or other computing device of an autonomous or semi-autonomous vehicle to track objects in the environment surrounding the vehicle.

The browser application 112 is an application for accessing and viewing web-based content. The web-based content may be provided by the video processing platform 110. The video processing platform 110 provides the web application 190 that enables users to view video content, track objects in the video content using the techniques herein, and/or annotate the video content in some implementations. A user of the client device 105 may access the web application 190 via the browser application 112, and the browser application 112 renders a user interface for interacting with the video processing platform 110 in the browser application 112.

Figure 2:
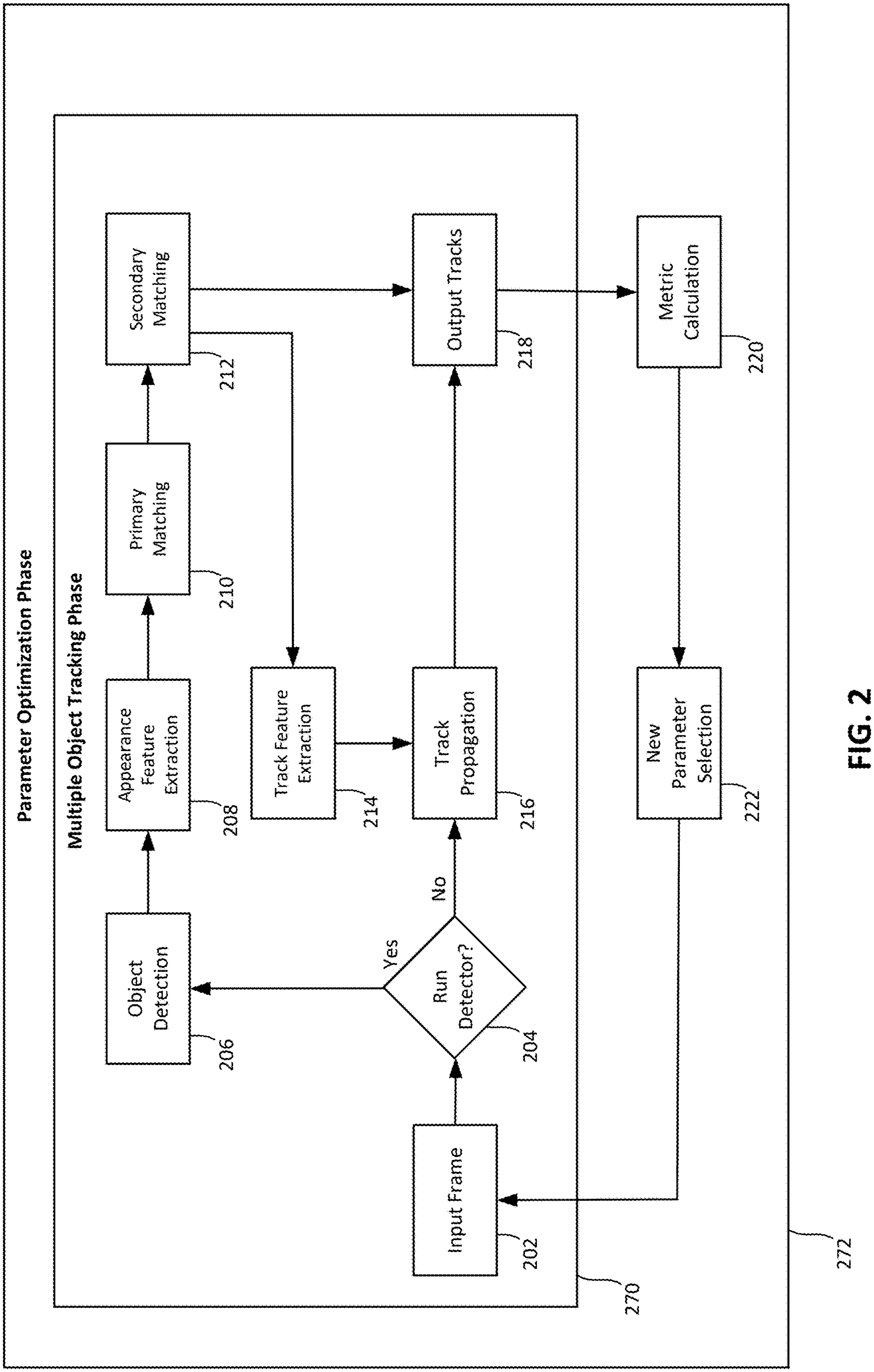
FIG. 2 is a diagram showing an example implementation of the object tracking pipeline shown in FIG. 1.

FIG. 2 is a diagram showing an example implementation of the object tracking pipeline 124 shown in FIG. 1. The object tracking pipeline 124 implements a multiple object tracking phase 270 and a parameter optimization phase 272. The multiple object tracking phase 270 includes an operation 202 in which an input frame of video content is received. The video content may be streamed in real time from the video source 115 in some implementations or maybe video content that has been previously captured by the video source 115 and stored in the video content datastore 168. In operation 204, the object tracking pipeline 124 makes a determination whether to run the object detector. In some implementations, the object tracking pipeline 124 determines whether a minimum frames per second (FPS) processing rate can be maintained should the object detector be run for the current frame. As discussed in the preceding examples, the object tracking pipeline 124 attempts to process the video in real-time as the video is streamed from the video source 115. If the object tracking pipeline 124 determines that processing the current frame of video content would cause the object tracking pipeline 124 to fall below the minimum FPS processing rate, the object tracking pipeline 124 proceeds to operation 216 and relies on the detection propagation unit 134 to propagate the detected objects from a previous frame to the current frame. Otherwise, the object tracking pipeline 124 proceeds to operation 206 to begin a two-stage object detection process.

In object detection operation 206, the MOT unit 132 performs object detection to identify objects in the current frame of video content. The MOT unit 132 can implement various object detection models to detect the objects in the current frame. The MOT unit 132 can utilize various detection models that are capable of receiving a frame of video content as an input and outputting a bounding box that surrounds each of the detected objects. The bounding boxes provide an indication of the location of each of the detected objects in the current frame of video content. The MOT unit 132 identifies objects in the current video frame and generates bounding boxes around these objects that represents the location of these objects in the current frame of video content. The MOT unit 132 then performs feature extraction operation 208 on the detected objects. The image feature extraction operation 208 can be performed using various image analysis techniques, including feature extraction algorithms and/or machine learning models trained to extract features from the frame of video content. The MOT unit 132 also performs object classification on the objects to determine as class of object for each of the detected objects. Various object classification techniques can be used, including a classification model trained to analyze the feature information associated with a detected object and to output a predicted object class.

The appearance of the objects can be used in the primary matching operation 210 and/or the secondary matching operation 212 to facilitate tracking the object from frame to frame in the video content. The two-stage approach to object detection and tracking helps to overcome changes in appearance of the object over time. The appearance of the object may change over to time due to changes in lighting, the position or orientation of the object, objection occlusion, sensor artifacts, and/or other such factors. The MOT unit 132 compares the appearance of the objects in the current frame with those of the object from the previous frame in which detection was performed and attempts to match the objects detected in the current frame with previously detected objects. The MOT unit 132 assigns a confidence score to each of the detected objects that provides an indication of how confident the MOT unit 132 is with each of the matches. The confidence score may be lower for objects whose appearance has changed from frame to frame due to the various factors above.

The MOT unit 132 then performs a primary matching operation 210 on the high confidence detected objects. The high confidence detected objects have a confidence score that satisfies a confidence score threshold. The MOT unit 132 first matches high confidence detected objects to existing object tracks. The existing object tracks represent the movement of these tracked objects within the frames of video content over time. The MOT unit 132 initiates new tracks for high confidence detected objects that could not be matched to existing tracks.

The MOT unit 132 then performs secondary matching operation 212 on the low confidence detected objects associated with confidence scores that did not satisfy the confidence score threshold. The MOT unit 132 first attempts to match the low confidence score objects with any remaining object tracks that were not matched with a high confidence score object. If the MOT unit 132 matches a low confidence detected object to a track, the MOT unit 132 assigns the low confidence detected object to this track and continues the track into the current frame. Otherwise, the MOT unit 132 discards low confidence detected objects that were not matched to a track. A technical benefit of this approach is that the MOT unit 132 augments the performance of the off-the-shelf MOT with this primary and secondary matching scheme, which can significantly improve the ability of the MOT-P framework to track objects in difficult scenarios with low confidence detections. The MOT unit 132 provides the object tracks detected using the two-phase approach as output object tracks 218 once the secondary matching operation 212 has been completed. The object tracks detected are also provided as an input to operation 214. In operation 214, the object track features are extracted for the object tracks of the detected objects. The object track feature information can then be used to facilitate detection propagation by the detection propagation unit 134 for frames in which no object detection and tracking is performed.

In detection propagation operation 216, the detection propagation unit 134 propagates the tracks for objects detected in the previous frame to the current frame and outputs predicted tracks for each of the objects. As discussed above, the detection propagation unit 134 can implement various techniques for detection propagation. These techniques can include a simple copy strategy in which the bounding boxes of the detected objects from the previous frame of the video content are directly replicated to the current frame. Another approach that the detection propagation unit 134 can take is to utilize a customized Kalman Filter to predict the bounding boxes of the objects detected in the previous frame in the current frame. This approach accounts for predicted motion of the detected objects from frame to frame, unlike simply copying the bounding boxes from the previous frame. In yet another approach, the detection propagation unit 134 relies on the integration of the ReID model. The ReID model compares the previous and current frames in an attempt to reidentify the previously tracked objects without performing a new detection operation. Regardless of the specific approach taken by the detection propagation unit 134, the detection propagation unit 134 outputs a predicted track for each of the objects. The object tracks determined by the detection propagation unit 134 are output as the output object tracks 218. Thus, the output object tracks 218 can be determined through the object detection approach or through the detection propagation approach. The output object tracks 218 can be used for various purposes depending on the particular implementation in which the MOT-P framework is being utilized. For instance, the output object tracks 218 can be used to track objects of interest in a video surveillance application, for placing content overlays in an augmented reality application, or for tracking the presence of nearby vehicles, people, animals, and/or other objects in a vehicle navigation application. These are non-limiting examples intended to demonstrate some of the ways the object track information may be utilized. Other implementations may utilize this data in different ways.

During the parameter optimization phase 272, various parameters used by the MOT may be optimized on a per class basis. Different classes of objects behave differently and provide different challenges when it comes to object detection and tracking. For instance, a dog will move differently than a tree. Consequently, the detectors score may be different depending on the model and class difficulty. The hyperparameter optimization unit 136 analyzes the output object tracks 218 and the object class associated with each of the detected objects to optimize various hyperparameters used by the MOT model. These hyperparameters may include but are not limited to threshold, motion weight, time to initialize, and/or other hyperparameters of the MOT. These parameters are optimized for each class of object that the MOT is configured to track. The parameter optimization phase 272 is performed during a training phase in which the object tracking pipeline 124 is provided test data as input. The test data includes various object types to enable the hyperparameter optimization unit 136 to optimize the hyperparameters for multiple object types. A technical benefit of this approach is that the MOT-P framework is tuned using specific hyperparameters for different classes of objects in contrast with current object trackers which utilize the same hyperparameters for all classes of objects. Consequently, the MOT-P framework can optimize performance for a wide range of object classes rather than selecting a set of hyperparameters that apply to all classes of objects. The hyperparameter optimization unit 136 performs a metric calculation operation 220 and a new parameter selection operation 222. In the metric calculation operation 220, the hyperparameter optimization unit 136 calculates the performance metrics for each of the classes of objects detected and tracked. The hyperparameter optimization unit 136 can determine whether the object tracking pipeline 124 is having difficulty identifying and tracking certain classes of objects. The hyperparameter optimization unit 136 may make this determination at least in part on the confidence scores associated with the objects identified for a particular class. In some implementations, the hyperparameter optimization unit 136 iteratively tests different combinations of hyperparameter settings to optimize the performance of the MOT model or models used by the MOT unit 132. The hyperparameter optimization unit 136 selects new hyperparameters, if necessary, in the new parameter selection operation 222.

Figure 3:
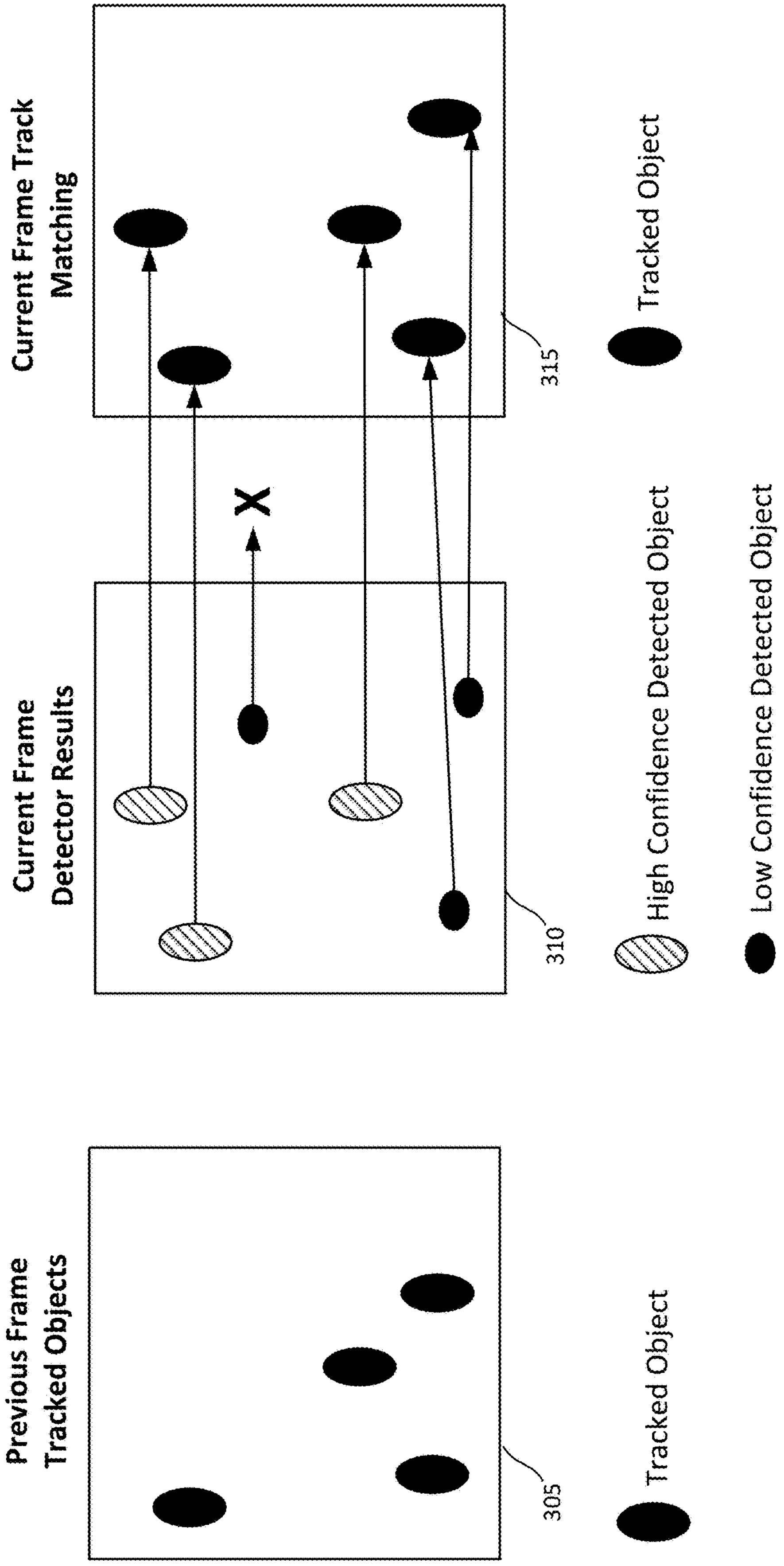
FIG. 3 is a diagram showing an example of two-stage detection matching implemented by the object tracking pipeline.

FIG. 3 is a diagram showing an example of two-stage detection matching implemented by the object tracking pipeline 124. The diagram shows the tracked objects from a previous frame 305 of the video content. In this example, the MOT unit 132 detected four tracked objects in the previous frame 305. The MOT unit 132 analyzes the current frame 310 and identifies three high confidence detected objects and three low confidence detected objects. The MOT unit 132 performs the primary matching operation 210 in which the high confidence detected objects are associated with existing tracks or with new tracks. In the example shown in FIG. 3, two of the high confidence detected objects are associated with existing tracks and one high confidence detected object is associated with a new track. The MOT unit 132 then performs the secondary matching operation 212 on the low confidence detected objects. In the example shown in FIG. 3, two of the low confidence detected objects are matched with previous tracks. A third low confidence detected object does not match with a previous track and the MOT unit 132 discards this low confidence detected object.

Figure 4A:
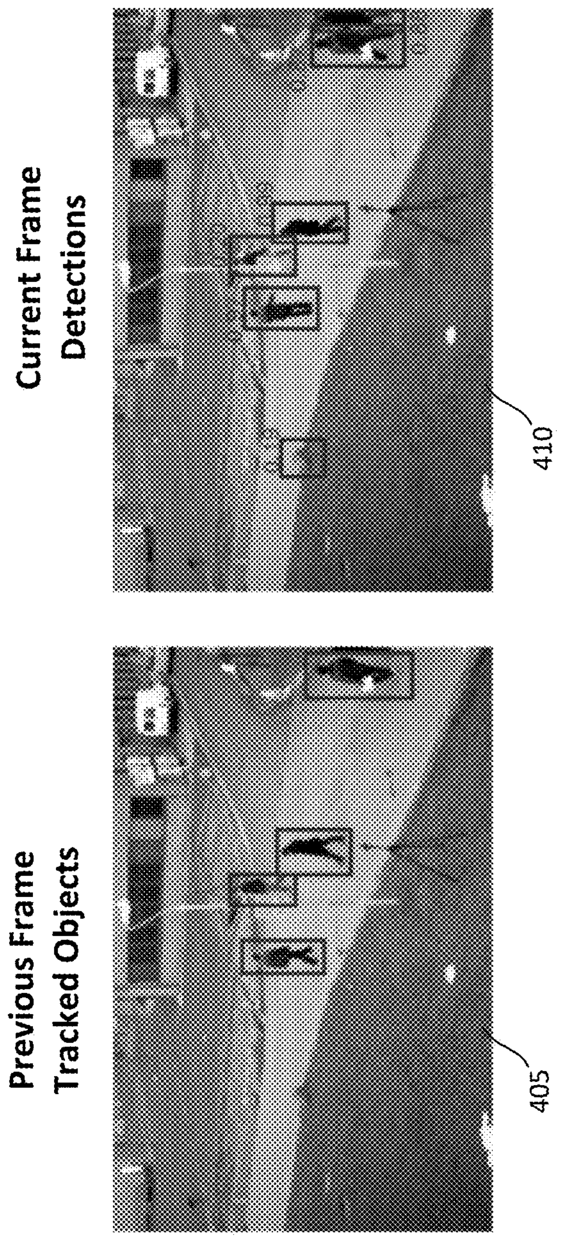
FIGS. 4A-4E are diagrams showing an example of the two-stage detection matching being applied to example video frames by the object tracking pipeline.

FIGS. 4A-4E is a diagram showing an example of the two-stage detection matching being applied to example video frames by the object tracking pipeline 124. FIG. 4A shows a previous frame 405 including the tracked object identified therein and a current frame 410 showing the objects detected therein. The tracked objects shown in frame 405 are surrounded by their respective bounding boxes. The detected objects shown in frame 410 are also surrounded by their respective bounding boxes. The detected objects are also shown with the respective confidence scores associated with each of the detected objects.

Figure 4B:
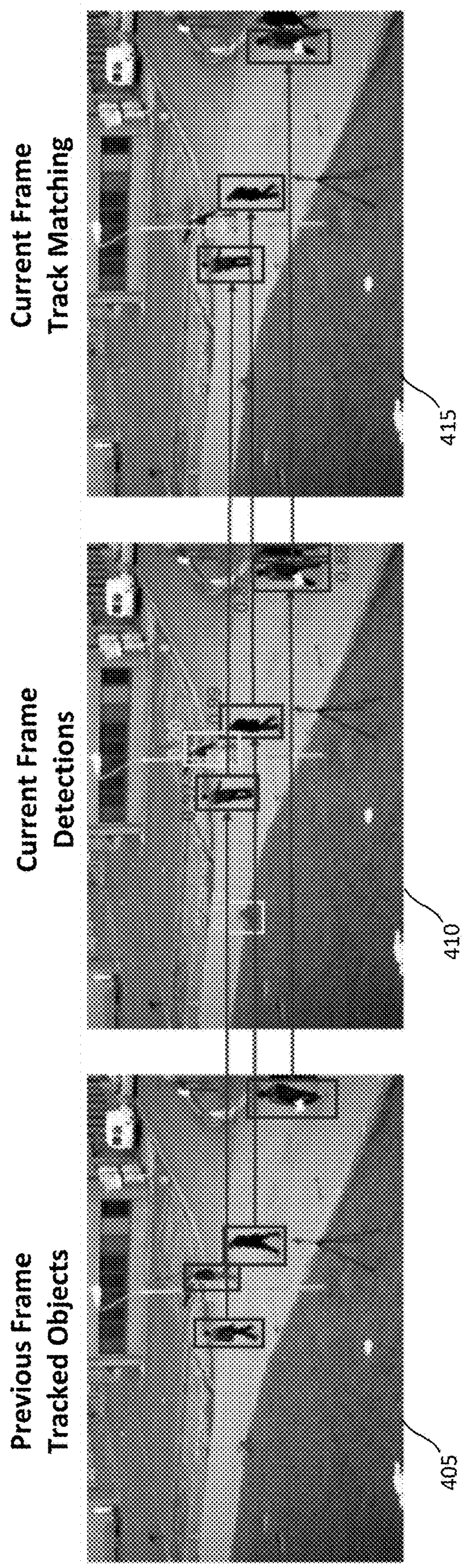
Figure 4C:
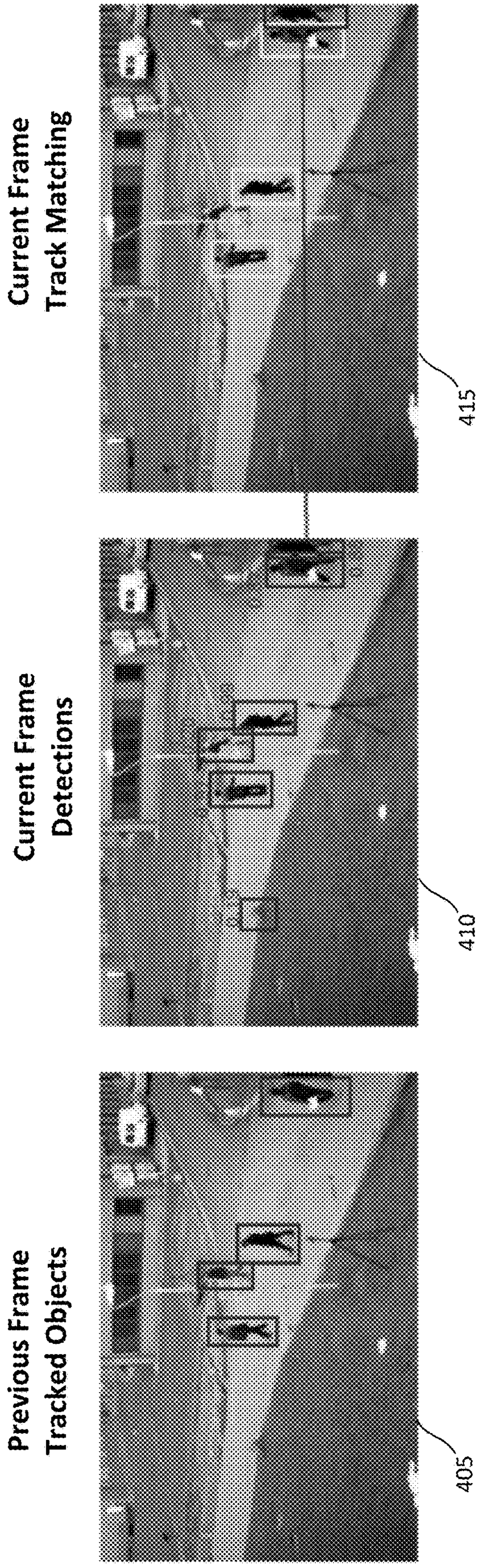

FIG. 4B shows the primary matching operation 210 being performed by the MOT unit 132 in which high confidence detection objects are matched to existing tracks in the current frame 415 by the MOT unit 132. FIG. 4C shows an unmatched high confidence detection object being associated with a newly initialized track by the MOT unit 132.

Figure 4D:
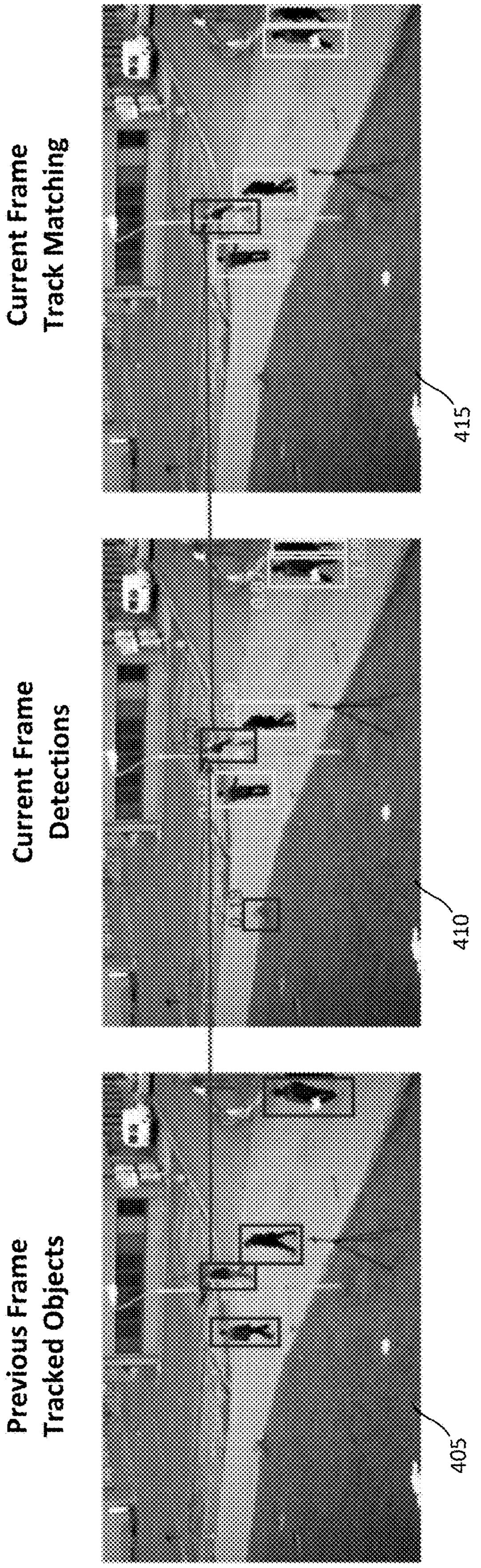
Figure 4E:
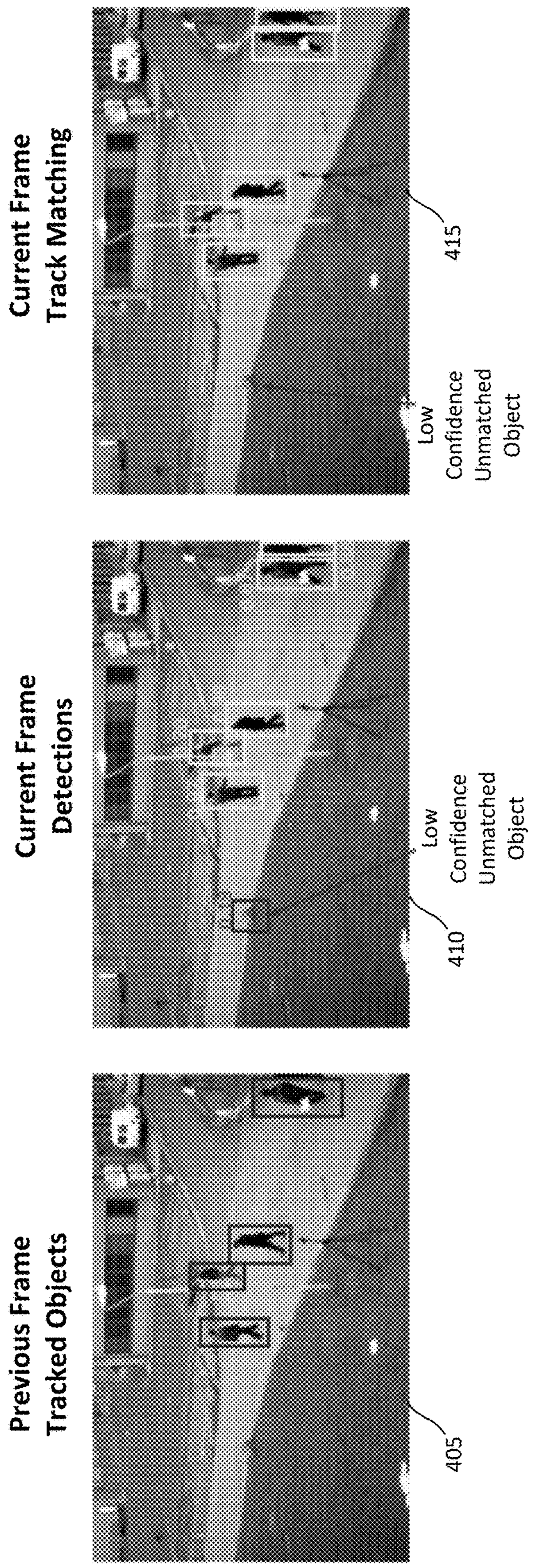

FIG. 4D shows the secondary matching operation 212 being performed by the MOT unit 132. The low confidence detection objects are matched to existing tracks. In the example shown in FIG. 4D, one of the low confidence detection objects matches an existing track and is associated with that track by the MOT unit 132. FIG. 4E shows a remaining low confidence detection object that did not match with an existing track being discarded by the MOT unit 132. The examples shown in FIGS. 4A-4E are non-limiting intended to help illustrate the two-phase tracking process implemented by the MOT unit 132.

Figure 5:
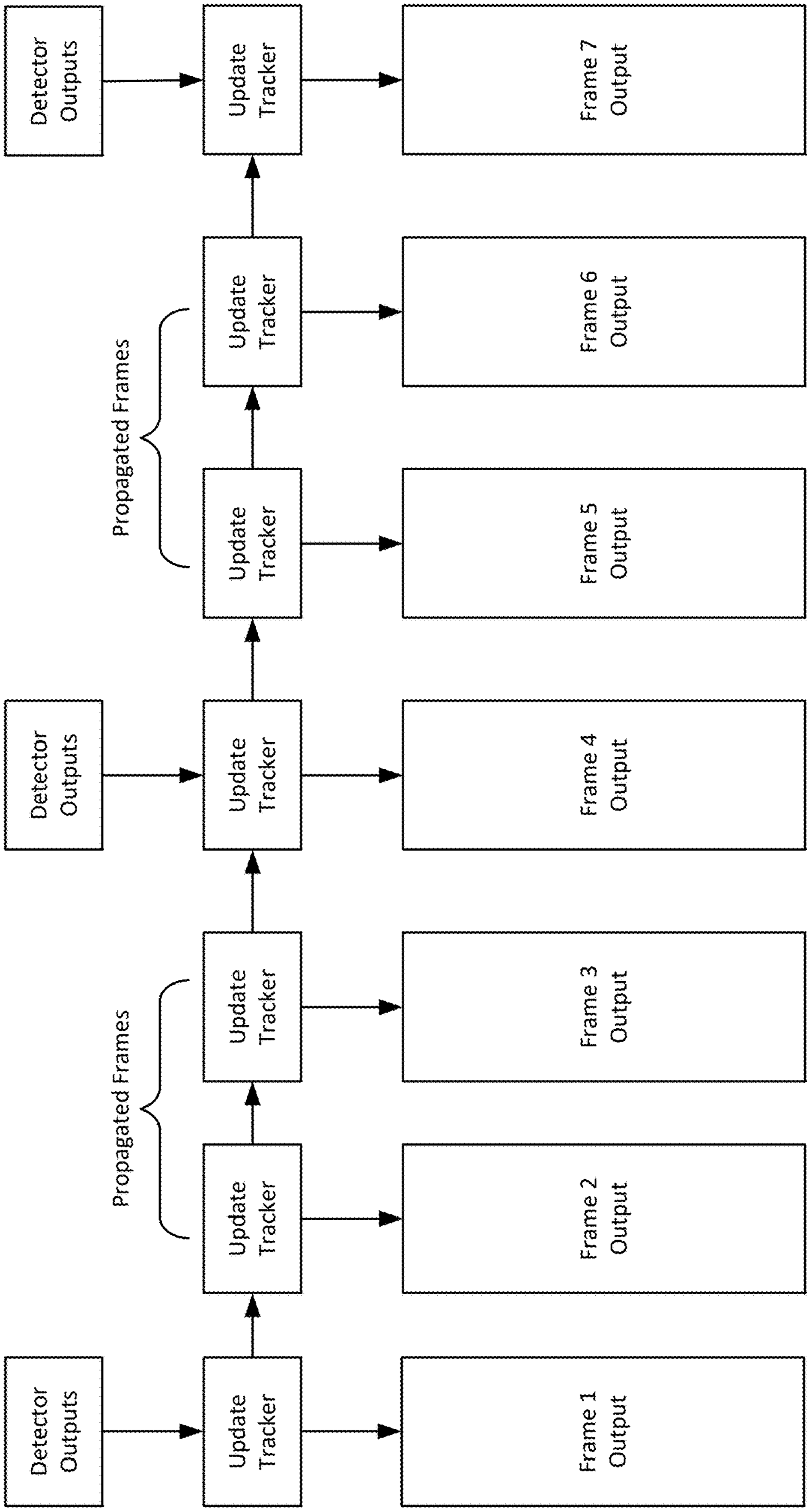
FIG. 5 is a flow diagram of an example of detection propagation performed by the object tracking pipeline shown in FIG. 1.

FIG. 5 is a flow diagram of an example of detection propagation performed by the detection propagation unit 134 of the object tracking pipeline 124 shown in FIG. 1. The detection propagation unit 134 propagates object track information across frames in instances in which performing an object detection would result in the throughput of the object tracking pipeline 124 falling below a minimum FPS threshold. In some implementations, the minimum FPS threshold is 30 FPS, and the detection propagation unit 134 propagates the track of tracked objects across a subset of the frames of the video content to satisfy the minimum FPS threshold. In the example shown in FIG. 5, the object tracking pipeline 124 processes seven frames of video content and attempts to detect and track objects therein. In this example, the MOT model is updated for each frame. However, the MOT detector model is only executed by the MOT unit 132 on every third frame of the video content and the detection propagation unit 134 propagates the track information for two frames before the MOT unit 132 executes the MOT model. The track information is updated for every frame by either the MOT unit 132 or the detection propagation unit 134. The examples shown in FIG. 5 is intended to illustrate the two-stage detection matching process discussed in the preceding examples. The number of sequential frames for which detection propagation is performed may vary.

Figure 6A:
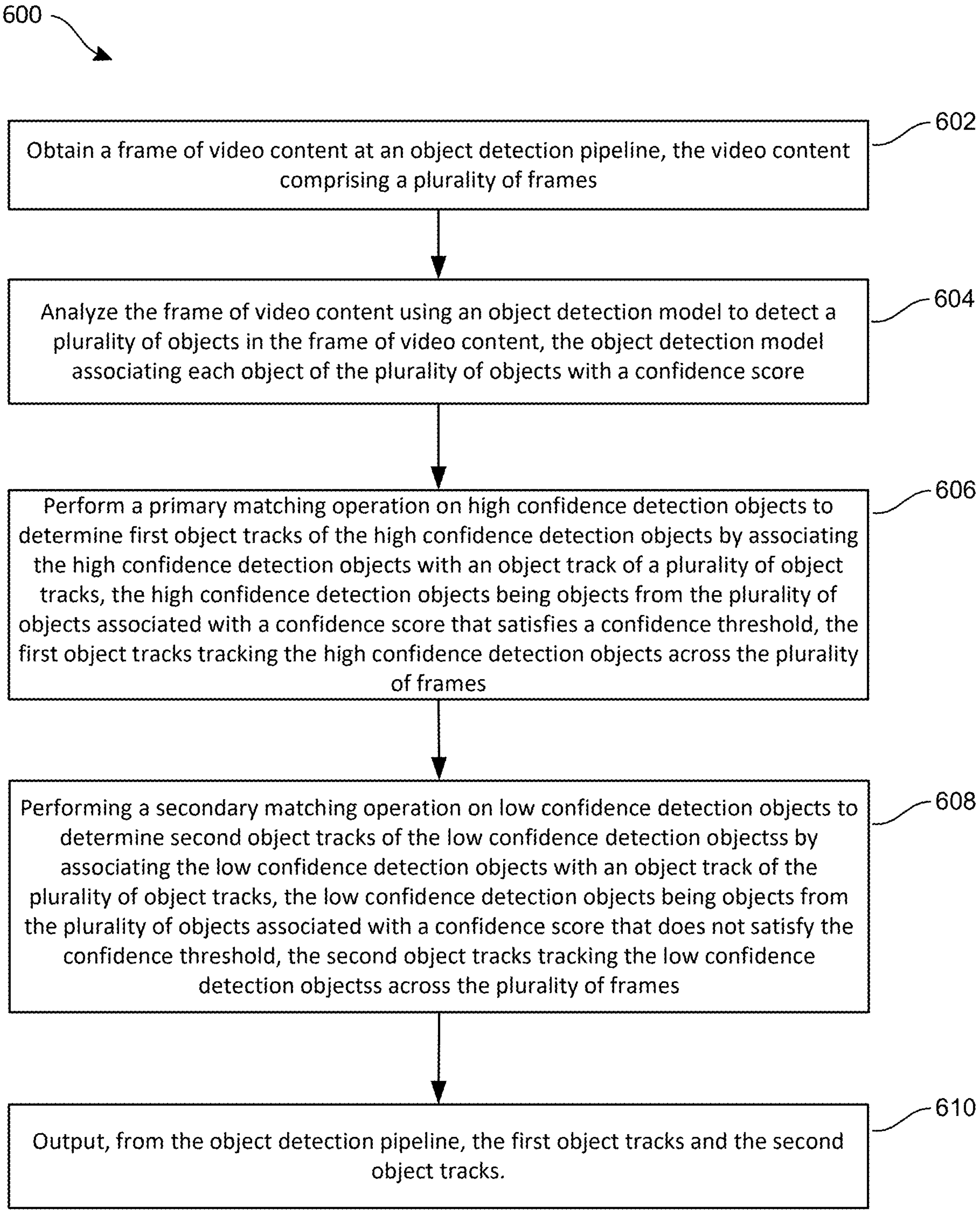
FIG. 6A is an example flow chart of an example process for multiple object tracking according to the techniques described herein.

FIG. 6A is an example flow chart of an example process 600 for multiple object tracking according to the techniques described herein. The process 600 can be implemented on the object tracking pipeline 124 of the video processing platform 110.

The process 600 includes an operation 602 of obtaining a frame of video content at an object detection pipeline, the video content comprising a plurality of frames. As discussed in the preceding examples, the video content may be streamed in real time from the video source 115 in some implementations or may be video content that has been previously captured by the video source 115 and stored in the video content datastore 168.

The process 600 includes an operation 604 of analyzing the frame of video content using an object detection model to detect a plurality of objects in the frame of video content. The object detection model associates each object of the plurality of objects with a confidence score. The MOT unit 132 of the object tracking pipeline 124 executes an object detection model on the frame of the video content to identify the objects in the frame.

The process 600 includes an operation 606 of performing a primary matching operation on high confidence detection objects to determine first object tracks of the high confidence detection objects by associating the high confidence detection objects with an object track of a plurality of object tracks. The high confidence detection objects are objects from the plurality of objects associated with a confidence score that satisfies a confidence threshold, and the first object tracks track the high confidence detection objects across the plurality of frames. As discussed in the preceding examples, the MOT unit 132 performs the primary matching operation.

The process 600 includes an operation 608 of performing a secondary matching operation on low confidence detection objects to determine second object tracks of the low confidence detection objects by associating the low confidence detection objects with an object track of the plurality of object tracks. The low confidence detection objects being objects from the plurality of objects associated with a confidence score that does not satisfy the confidence threshold, and the second object tracks tracking the low confidence detection objects across the plurality of frames. The low confidence detection objects being objects from the plurality of objects associated with a confidence score that does not satisfy the confidence threshold. As discussed in the preceding examples, the MOT unit 132 performs the secondary matching operation.

The process 600 includes an operation 610 of o outputting, from the object detection pipeline, the first object tracks and the second object tracks. The output object tracks 218 can be used for various purposes depending on the particular implementation in which the MOT-P framework is being utilized. For instance, the output object tracks 218 can be used to track objects of interest in a video surveillance application, for placing content overlays in an augmented reality application, or for tracking the presence of nearby vehicles, people, animals, and/or other objects in a vehicle navigation application.

Figure 6B:
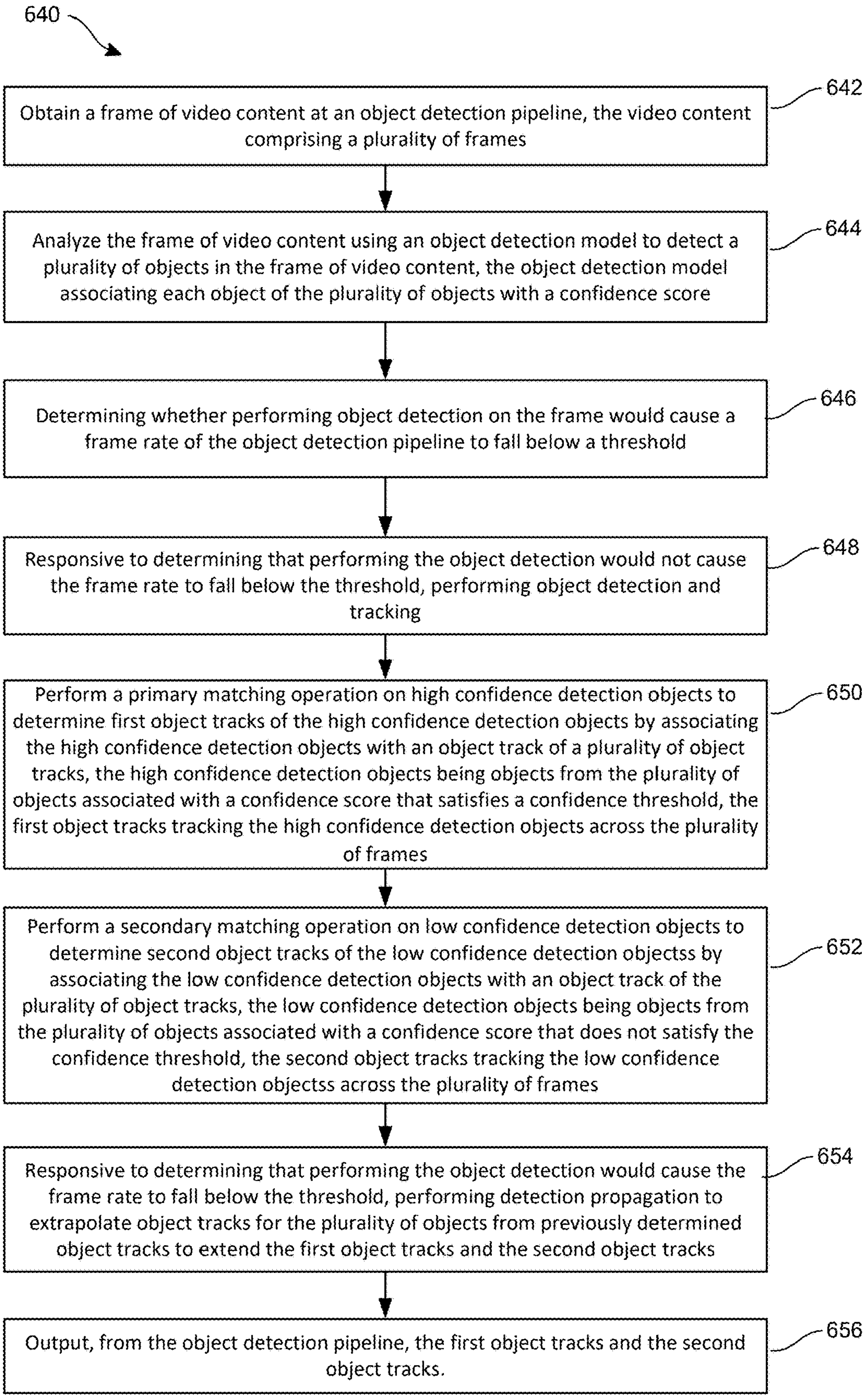
FIG. 6B is an example flow chart of another example process for multiple object tracking according to the techniques described herein.

FIG. 6B is an example flow chart of another example process 640 for multiple object tracking according to the techniques described herein. The process 640 can be implemented by the video processing platform 110.

The process 640 includes an operation 642 of obtaining a frame of video content at an object detection pipeline, the video content comprising a plurality of frames. As discussed in the preceding examples, the video content may be streamed in real time from the video source 115 in some implementations or may be video content that has been previously captured by the video source 115 and stored in the video content datastore 168.

The process 640 includes an operation 644 of analyzing the frame of video content using an object detection model to detect a plurality of objects in the frame of video content, the object detection model associating each object of the plurality of objects with a confidence score. The MOT unit 132 of the object tracking pipeline 124 executes an object detection model on the frame of the video content to identify the objects in the frame.

The process 640 includes an operation 646 of determining whether performing object detection on the frame would cause a frame rate of the object detection pipeline to fall below a threshold. The object tracking pipeline 124 determines whether an object detection or detection propagation operation should be performed. This determination is based on whether the frame rate at which the object tracking pipeline 124 processes frames of video would fall below an acceptable threshold, such as but not limited to 30 FPS, if object detection were to be performed on the current frame. Performing object detection for every frame may take too long for the object tracking pipeline 124 to be able to satisfy the desired frame rate.

The process 640 includes an operation 648 of responsive to determining that performing the object detection would not cause the frame rate to fall below the threshold, performing object detection and tracking. The operation 648 includes an operation 650 of performing a primary matching operation on high confidence detection objects to determine first object tracks of the high confidence detection objects by associating the high confidence detection objects with an object track of a plurality of object tracks, and an operation 652 of performing a secondary matching operation on low confidence detection objects to determine second object tracks of the low confidence detection objects by associating the low confidence detection objects with an object track of the plurality of object tracks. The high confidence detection objects are objects from the plurality of objects associated with a confidence score that satisfies a confidence threshold, and the first object tracks track the high confidence detection objects across the plurality of frames. The low confidence detection objects being objects from the plurality of objects associated with a confidence score that does not satisfy the confidence threshold, the second object tracks tracking the low confidence detection objects across the plurality of frames.

The process 640 includes an operation 654 of responsive to determining that performing the object detection would cause the frame rate to fall below the threshold, performing detection propagation to extrapolate object tracks for the plurality of objects from previously determined object tracks to extend the first object tracks and the second object tracks. As discussed in the preceding examples, the detection propagation unit 134 performs the detection propagations discussed in the preceding examples.

The process 640 includes an operation 656 of outputting, from the object detection pipeline, the first object tracks and the second object tracks. As discussed above, the output object tracks 218 can be used for various purposes depending on the particular implementation in which the MOT-P framework is being utilized. For instance, the output object tracks 218 can be used to track objects of interest in a video surveillance application, for placing content overlays in an augmented reality application, or for tracking the presence of nearby vehicles, people, animals, and/or other objects in a vehicle navigation application.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
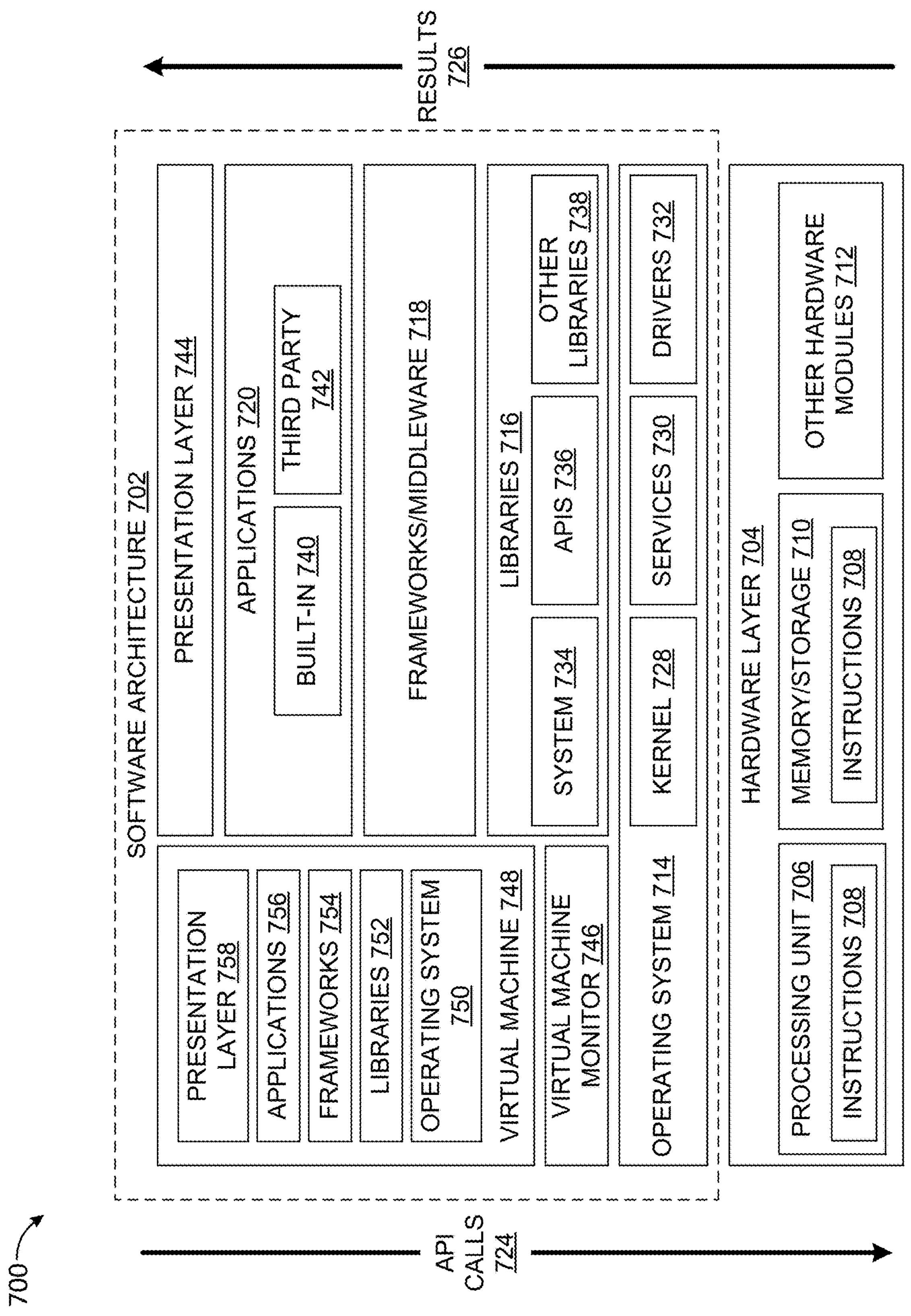
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks/middleware 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks/middleware 718 provide a higher-level common infrastructure that may be used by the applications 720 and/or other software modules. For example, the frameworks/middleware 718 may provide various graphic user interface (GUI) functions, high-level resource management, or high-level location services. The frameworks/middleware 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks/middleware 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
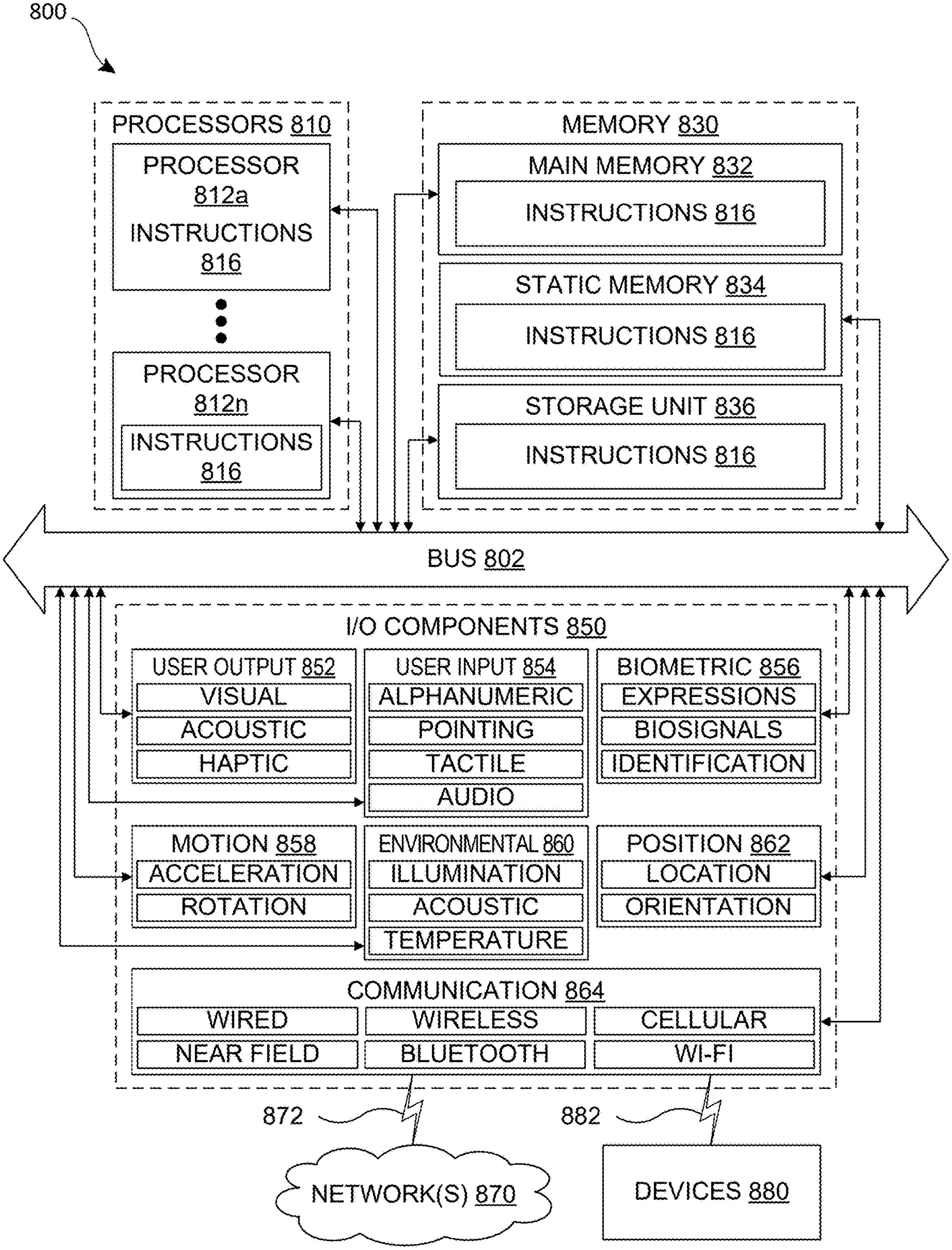
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory/storage 830, and I/O components 850, which may be communicatively coupled via, for example, a bus 802. The bus

802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multicore processor including cores that may execute instructions contemporaneously. Although FIG. 8 shows multiple processors, the machine 800 may include a single processor with a single core, a single processor with multiple cores (for example, a multicore processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a memory storing executable instructions that, when executed, cause the processor alone or in combination with other processors to perform operations of:

obtaining a frame of video content at an object detection pipeline, the video content comprising a plurality of frames;

analyzing the frame of video content using an object detection model to detect a plurality of objects in the frame of video content, the object detection model associating each object of the plurality of objects with a confidence score;

determining whether to perform object detection on the frame or detection propagation based on whether performing the object detection on the frame would cause a frame rate of the object detection pipeline to fall below a threshold;

responsive to determining that the frame rate would fall below the threshold if the object detection pipeline were to perform object detection on the frame:

performing detection propagation to extrapolate object tracks for a plurality of objects from previously determined object tracks; and outputting the object tracks for the plurality of objects for the frame; and responsive to determining that the frame rate would not fall below the threshold, performing the object detection on the frame by:

performing a primary matching operation on high confidence detection objects to determine first object tracks of the high confidence detection objects by associating the high confidence detection objects with an object track of a plurality of object tracks, the high confidence detection objects being objects from the plurality of objects associated with a confidence score that satisfies a confidence threshold, the first object tracks tracking the high confidence detection objects across the plurality of frames;

performing a secondary matching operation on low confidence detection objects to determine second object tracks of the low confidence detection objects by associating the low confidence detection objects with an object track of the plurality of object tracks, the low confidence detection objects being objects from the plurality of objects associated with a confidence score that does not satisfy the confidence threshold, the second object tracks tracking the low confidence detection objects across the plurality of frames; and outputting, from the object detection pipeline, the first object tracks and the second object tracks.

2. The data processing system of claim 1, wherein performing the primary matching operation on high confidence detection objects further comprises:

comparing attributes of a high confidence detection object with attributes of previously tracked objects from a previous frame of the video content to determine whether the high confidence detection objects correspond to the previously tracked objects, the previously tracked objects being associated with an object track;

associating the high confidence detection object with the object track of a previously tracked object that corresponds with the high confidence detection object; and associating the high confidence detection object with a new object track responsive to the high confidence detection object not corresponding with any of the previously tracked objects.

3. The data processing system of claim 1, wherein performing the secondary matching operation on low confidence detection objects further comprises:

comparing attributes of a low confidence detection object with attributes of previously tracked objects from a previous frame of the video content to determine whether the low confidence detection objects correspond to the previously tracked objects, the previously tracked objects being associated with an object track;

associating the low confidence detection object with the object track of a previously tracked object that corresponds with the low confidence detection object; and discarding the low confidence detection object responsive to the low confidence detection object not corresponding with any of the previously tracked objects.

4. The data processing system of claim 1, wherein the memory further includes instructions configured to cause the processor alone or in combination with other processors to perform operations of:

performing a tuning operation to tune one or more hyperparameters of the object detection model to determine object-class specific hyperparameter values for the object detection model.

5. The data processing system of claim 1, wherein the memory further includes instructions configured to cause the processor alone or in combination with other processors to perform operations of:

providing the plurality of object tracks to an application to cause the application to perform one more actions based on the plurality of object tracks.

6. The data processing system of claim 1, wherein performing detection propagation to extrapolate object tracks for the plurality of objects from previously determined object tracks further comprises:

copying a bounding box associated with previously determined object tracks to the frame of the video content.

7. The data processing system of claim 1, wherein performing detection propagation to extrapolate object tracks for the plurality of objects from previously determined object tracks further comprises:

utilizing a Kalman filter to predict bounding boxes for the plurality of objects based on the previously determined object tracks.

8. The data processing system of claim 1, wherein performing detection propagation to extrapolate object tracks for the plurality of objects from previously determined object tracks further comprises:

utilizing a reidentification model to extrapolate the object tracks of from the previously determined object tracks.

9. A method implemented in a data processing system for tracking multiple objects, the method comprising:

obtaining a frame of video content at an object detection pipeline, the video content comprising a plurality of frames;

analyzing the frame of video content using an object detection model to detect a plurality of objects in the frame of video content, the object detection model associating each object of the plurality of objects with a confidence score;

determining whether to perform object detection on the frame or detection propagation based on whether performing the object detection on the frame would cause a frame rate of the object detection pipeline to fall below a threshold;

responsive to determining that the frame rate would fall below the threshold if the object detection pipeline were to perform object detection on the frame:

performing detection propagation to extrapolate object tracks for a plurality of objects from previously determined object tracks; and outputting the object tracks for the plurality of objects for the frame; and responsive to determining that the frame rate would not fall below the threshold, performing the object detection on the frame by:

performing a primary matching operation on high confidence detection objects to determine first object tracks of the high confidence detection objects by associating the high confidence detection objects with an object track of a plurality of object tracks, the high confidence detection objects being objects from the plurality of objects associated with a confidence score that satisfies a confidence threshold, the first object tracks tracking the high confidence detection objects across the plurality of frames;

performing a secondary matching operation on low confidence detection objects to determine second object tracks of the low confidence detection objects by associating the low confidence detection objects with an object track of the plurality of object tracks, the low confidence detection objects being objects from the plurality of objects associated with a confidence score that does not satisfy the confidence threshold, the second object tracks tracking the low confidence detection objects across the plurality of frames; and outputting, from the object detection pipeline, the first object tracks and the second object tracks.

10. The method of claim 9, wherein performing the primary matching operation on high confidence detection objects further comprises:

comparing attributes of a high confidence detection object with attributes of previously tracked objects from a previous frame of the video content to determine whether the high confidence detection objects correspond to the previously tracked objects, the previously tracked objects being associated with an object track;

associating the high confidence detection object with the object track of a previously tracked object that corresponds with the high confidence detection object; and associating the high confidence detection object with a new object track responsive to the high confidence detection object not corresponding with any of the previously tracked objects.

11. The method of claim 9, wherein performing the secondary matching operation on low confidence detection objects further comprises:

comparing attributes of a low confidence detection object with attributes of previously tracked objects from a previous frame of the video content to determine whether the low confidence detection objects correspond to the previously tracked objects, the previously tracked objects being associated with an object track;

associating the low confidence detection object with the object track of a previously tracked object that corresponds with the low confidence detection object; and discarding the low confidence detection object responsive to the low confidence detection object not corresponding with any of the previously tracked objects.

12. The method of claim 10, wherein performing detection propagation to extrapolate object tracks for the plurality of objects from previously determined object tracks further comprises:

copying a bounding box associated with previously determined object tracks to the frame of the video content.

13. The method of claim 10, wherein performing detection propagation to extrapolate object tracks for the plurality of objects from previously determined object tracks further comprises:

utilizing a Kalman filter to predict bounding boxes for the plurality of objects based on the previously determined object tracks.

14. The method of claim 10, wherein performing detection propagation to extrapolate object tracks for the plurality of objects from previously determined object tracks further comprises:

utilizing a reidentification model to extrapolate the object tracks of from the previously determined object tracks.

15. A data processing system comprising:

a processor; and a memory storing executable instructions that, when executed, cause the processor alone or in combination with other processors to perform operations of:

obtaining a frame of video content at an object detection pipeline, the video content comprising a plurality of frames;

analyzing the frame of video content using an object detection model to detect a plurality of objects in the frame of video content, the object detection model associating each object of the plurality of objects with a confidence score;

determining whether performing object detection on the frame would cause a frame rate of the object detection pipeline to fall below a threshold;

responsive to determining that performing the object detection would not cause the frame rate to fall below the threshold, performing object detection and tracking comprising:

performing a primary matching operation on high confidence detection objects to determine first object tracks of the high confidence detection objects by associating the high confidence detection objects with an object track of a plurality of object tracks, the high confidence detection objects being objects from the plurality of objects associated with a confidence score that satisfies a confidence threshold, the first object tracks tracking the high confidence detection objects across the plurality of frames, and performing a secondary matching operation on low confidence detection objects to determine second object tracks of the low confidence detection objects by associating the low confidence detection objects with an object track of the plurality of object tracks, the low confidence detection objects being objects from the plurality of objects associated with a confidence score that does not satisfy the confidence threshold, the second object tracks tracking the low confidence detection objects across the plurality of frames;

responsive to determining that performing the object detection would cause the frame rate to fall below the threshold, performing detection propagation to extrapolate object tracks for the plurality of objects from previously determined object tracks to extend the first object tracks and the second object tracks; and outputting, from the object detection pipeline, the first object tracks and the second object tracks.

16. The data processing system of claim 15, wherein performing the primary matching operation on high confidence detection objects further comprises:

comparing attributes of a high confidence detection object with attributes of previously tracked objects from a previous frame of the video content to determine whether the high confidence detection objects correspond to the previously tracked objects, the previously tracked objects being associated with an object track;

associating the high confidence detection object with the object track of a previously tracked object that corresponds with the high confidence detection object; and associating the high confidence detection object with a new object track responsive to the high confidence detection object not corresponding with any of the previously tracked objects.

17. The data processing system of claim 15, wherein performing the secondary matching operation on low confidence detection objects further comprises:

comparing attributes of a low confidence detection object with attributes of previously tracked objects from a previous frame of the video content to determine whether the low confidence detection objects correspond to the previously tracked objects, the previously tracked objects being associated with an object track;

associating the low confidence detection object with the object track of a previously tracked object that corresponds with the low confidence detection object; and discarding the low confidence detection object responsive to the low confidence detection object not corresponding with any of the previously tracked objects.

18. The data processing system of claim 15, wherein the memory further includes instructions configured to cause the processor alone or in combination with other processors to perform operations of:

performing a tuning operation to tune one or more hyperparameters of the object detection model to determine object-class specific hyperparameter values for the object detection model.

* * * * *